United States Patent
Enstad et al.

(10) Patent No.: US 8,169,463 B2
(45) Date of Patent: May 1, 2012

(54) METHOD AND SYSTEM FOR AUTOMATIC CAMERA CONTROL

(75) Inventors: Gisle Enstad, Sandvika (NO); Jan Tore Korneliussen, Oslo (NO); Per Ove Husoy, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 959 days.

(21) Appl. No.: 12/171,938

(22) Filed: Jul. 11, 2008

(65) Prior Publication Data

US 2009/0015658 A1    Jan. 15, 2009

Related U.S. Application Data

(60) Provisional application No. 60/949,718, filed on Jul. 13, 2007.

(30) Foreign Application Priority Data

Jul. 13, 2007  (NO) .................................... 20073621

(51) Int. Cl.
*H04N 7/14* (2006.01)
(52) U.S. Cl. ................ 348/14.08; 348/14.01; 348/14.03
(58) Field of Classification Search .... 348/14.01–14.03, 348/14.05, 14.07–14.1, 14.12, 14.16, 25
See application file for complete search history.

(56) References Cited

U.S. PATENT DOCUMENTS

| | | | |
|---|---|---|---|
| 5,778,082 | A | 7/1998 | Chu et al. |
| 5,852,669 | A | 12/1998 | Eleftheriadis et al. |
| 7,057,636 | B1 | 6/2006 | Cohen-Solal et al. |
| 2002/0140804 | A1 | 10/2002 | Comenarez et al. |
| 2003/0103647 | A1 | 6/2003 | Rui et al. |
| 2004/0257432 | A1 | 12/2004 | Girish et al. |

FOREIGN PATENT DOCUMENTS

| | | |
|---|---|---|
| WO | WO 99/06940 | 2/1999 |
| WO | WO 99/60788 | 11/1999 |
| WO | WO 03/043327 | 5/2003 |

*Primary Examiner* — Suhan Ni
(74) *Attorney, Agent, or Firm* — Oblon, Spivak, McClelland, Maier & Neustadt, L.L.P.

(57) ABSTRACT

A method for automatically determining an orientation and zoom of an image pickup device associated with a video conferencing system, wherein the method includes the steps of: generating, at the image pickup device, an image signal representative of an image framed by the image pickup device; processing the image signal to identify objects plural users of the video conferencing system in the image; steering the image pickup device to an initial orientation; determining a location of all the identified objects relative to a reference point and determining respective sizes of the identified objects; defining an area of interest in the image, wherein the area of interest includes all the identified objects; and steering the image pickup device to frame the defined area of interest including all the identified objects where a center of the frame substantially coincides with a center of all the identified objects.

27 Claims, 12 Drawing Sheets

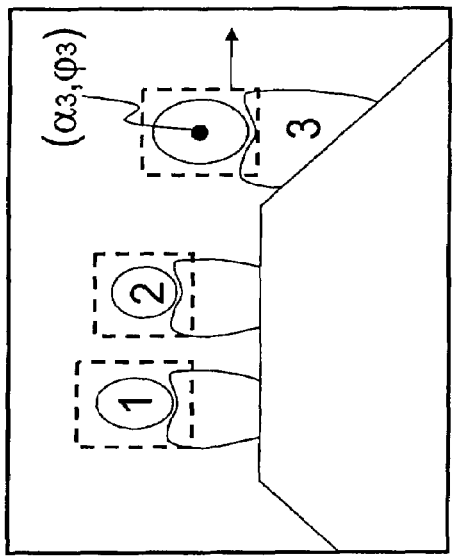
Figure 11a
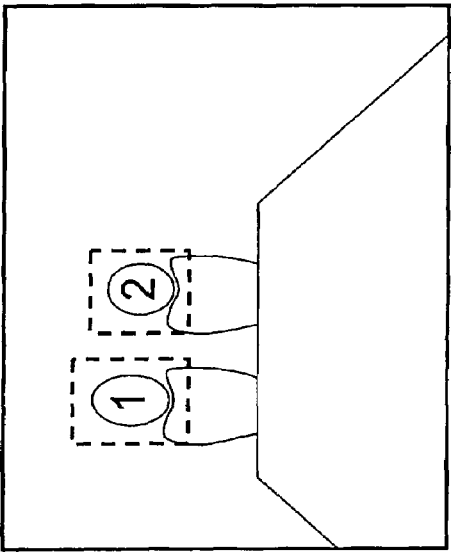
Figure 11b
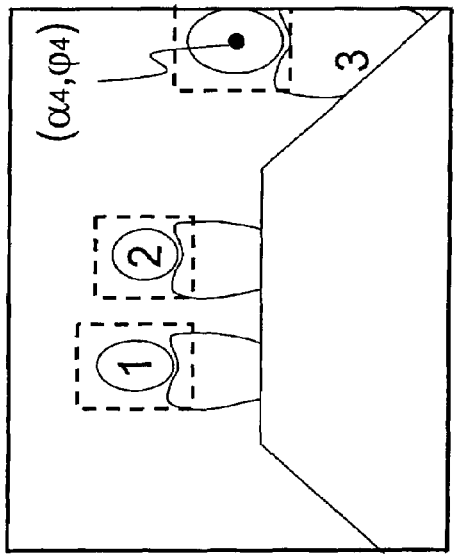
Figure 11c
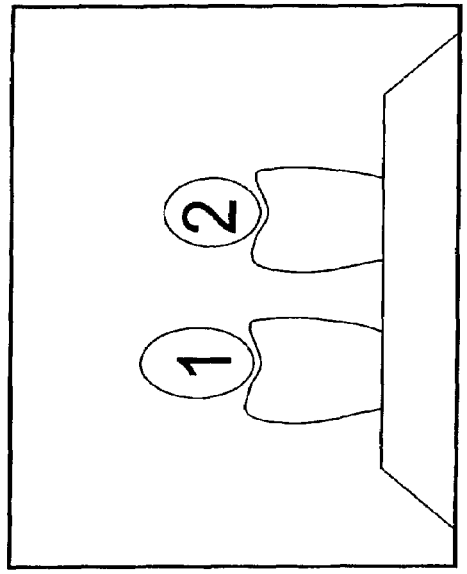
Figure 11d
Figure 11

METHOD AND SYSTEM FOR AUTOMATIC CAMERA CONTROL

CROSS-REFERENCE TO RELATED APPLICATIONS

The present application claims the benefit of provisional application 60/949,718 under 35 U.S.C. §119, filed Jul. 13, 2007, which is incorporated herein by reference in its entirety. The present application claims the benefit of Norwegian application NO 20073621 under 35 U.S.C. §119, filed Jul. 13, 2007 in the Norwegian Patent Office, which is incorporated herein by reference in its entirety.

FIELD OF THE INVENTION

The present invention relates to automatic adjustment of camera orientation and zoom in situations, such as but not limited to, video conferencing.

BACKGROUND OF THE INVENTION

In most high end video conferencing systems, high quality cameras with pan-, tilt-, and zoom capabilities are used to frame a view of the meeting room and the participants in the conference. The cameras typically have a wide field-of-view (FOV), and high mechanical zooming capability. This allows for both good overview of a meeting room, and the possibility of capturing close-up images of participants. The video stream from the camera is compressed and sent to one or more receiving sites in the video conference. All sites in the conference receive live video and audio from the other sites in the conference, thus enabling real time communication with both visual and acoustic information.

Video conferences vary a great deal when it comes to purpose, the number of participants, layout of conference rooms, etc. Each meeting configuration typically requires an individual adjustment of the camera in order to present an optimal view. Adjustments to the camera may be required both before and during the video conference. E.g. in a video conference room seating up to 16 persons, it is natural that the video camera is preset to frame all of the 16 available seat locations. However, if only 2 or 3 participants are present, the wide field of view camera setting will give the receiving end a very poor visual representation.

Adjustments to the camera are typically done via a remote control, either by manually controlling the camera pan, tilt and zoom, or by choosing between a set of pre-defined camera positions. These pre-defined positions are manually programmed. Often, before or during a video conference, the users do not want to be preoccupied with the manual control of the camera, or the less experienced user may not even be aware of the possibility (or how) to change the cameras field of view. Hence, the camera is often left sub-optimally adjusted in a video conference, resulting in a degraded video experience.

Some video conferencing systems with Camera Tracking capabilities exist. However, the purpose of these systems is to automatically focus the camera on an active speaker. These systems are typically based on speaker localization by audio signal processing with a microphone array, and/or in combination with image processing.

Some digital video cameras (for instance web-cams) use video analysis to detect, center on and follow the face of one person within a limited range of digital pan, tilt and zoom. However, these systems are only suitable for one person, require that the camera is initially correctly positioned and have a very limited digital working range. Hence, none of the conventional systems mentioned above describe a system for automated configuration of the camera in a video-conference setting.

SUMMARY OF THE INVENTION

It is an object of the present invention to provide a method and a system solving at least one of the above-mentioned problems in conventional systems. A non-limiting embodiment includes an automatic field adjustment system that ensures a good camera orientation for multiple situations (i.e., multiple configurations of people and/or equipment) in a video conferencing room.

A non-limiting embodiment includes a method for automatically determining an orientation and zoom of an image pickup device associated with a video conferencing system, wherein the method includes the steps of: generating, at the image pickup device, an image signal representative of an image framed by the image pickup device; processing the image signal to identify objects plural users of the video conferencing system in the image; steering the image pickup device to an initial orientation; determining a location of all the identified objects relative to a reference point and determining respective sizes of the identified objects; defining an area of interest in the image, wherein the area of interest includes all the identified objects; and steering the image pickup device to frame the defined area of interest including all the identified objects where a center of the frame substantially coincides with a center of all the identified objects.

It is to be understood that both foregoing general description of the invention and the following detailed description are exemplary, but are not restrictive of the invention.

BRIEF DESCRIPTION OF THE DRAWINGS

In order to make the invention more readily understandable, the discussion that follows will refer to the accompanying drawings. A more complete appreciation of the invention and many of the attendant advantages thereof will be readily obtained as the same becomes better understood by reference to the following detailed description when considered in connection with the accompanying drawings, wherein:

FIG. 11a illustrates that a person leaves the conference; FIG. 11b illustrates that a person is near the edge of the frame; FIG. 11c illustrates the remaining two persons; and FIG. 11d illustrates the optimal view for the remaining persons.

DETAILED DESCRIPTION

In the following, non-limiting embodiments of the present invention will be discussed by referring to the accompanying drawings. However, people skilled in the art will realize other applications and modifications within the scope of the invention as defined in the enclosed claims are possible.

The embodiments below discuss the present invention in the context of a video conferencing system or in a video conference room. However, these are only exemplary embodiments and the present invention is envisioned to work in other systems and situations where automatic camera control is desired, such as the creation of internet video with a web camera. A person of ordinary skill in the art would understand that the present invention is applicable to systems that do not require a video conference.

Figure 1:
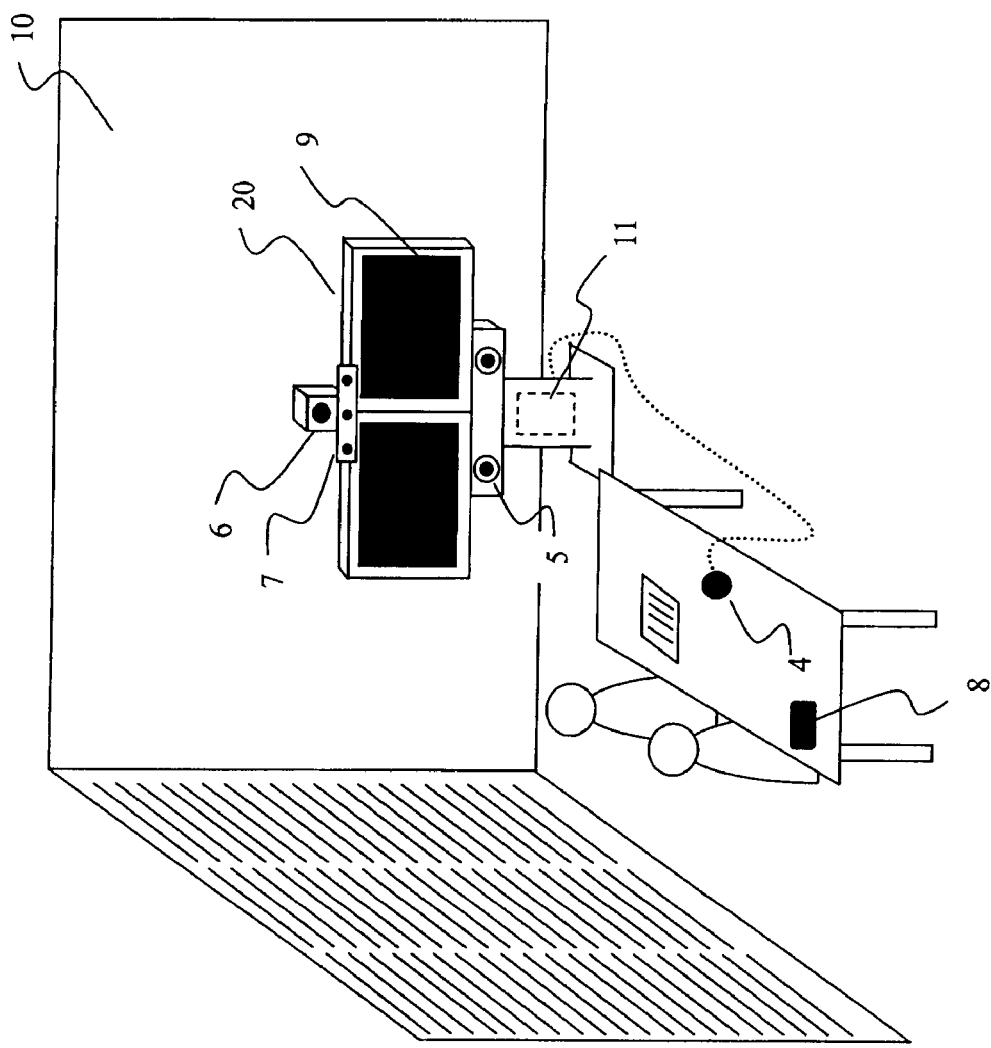
FIG. 1 illustrating a typical video conferencing room.

FIG. 1 illustrates a typical video conferencing room 10, with an exemplary video conferencing system 20. Video conferencing systems 20 may, for example, consist of the following components: a codec 11 (for coding and decoding audio and video information), a user input device 8 (i.e. remote control or keyboard), a image capture device 6 (a camera, which can be a high-definition camera), an audio capture device 4 and/or 7 (microphone), a video display 9 (a screen which can be a high-definition display) and an audio reproduction device 5 (loudspeakers). Often, high end video conferencing systems (VCS) use high quality cameras 6 with motorized pan-, tilt-, and zoom capabilities.

Non-limiting embodiments of the present invention use video detection techniques to detect participants and their respective locations in video frames captured by the camera 6, and based on the location and sizes of the detected participants automatically determine and use the optimal camera orientation and zoom for capturing the best view of all the participants.

There may be many opinions on what the "best view" of a set of participants in a video conference is. However, as used herein, a "best view" is referred to as a close-up of a group of participants, where the video frame center substantially coincides with the center of the group, and where the degree of zoom gives a tightly fitted image around the group. However, the image must not be too tight, showing at least a portion of the participant's upper body, and providing room for the participants to move slightly without exiting the video frame.

Figure 2:
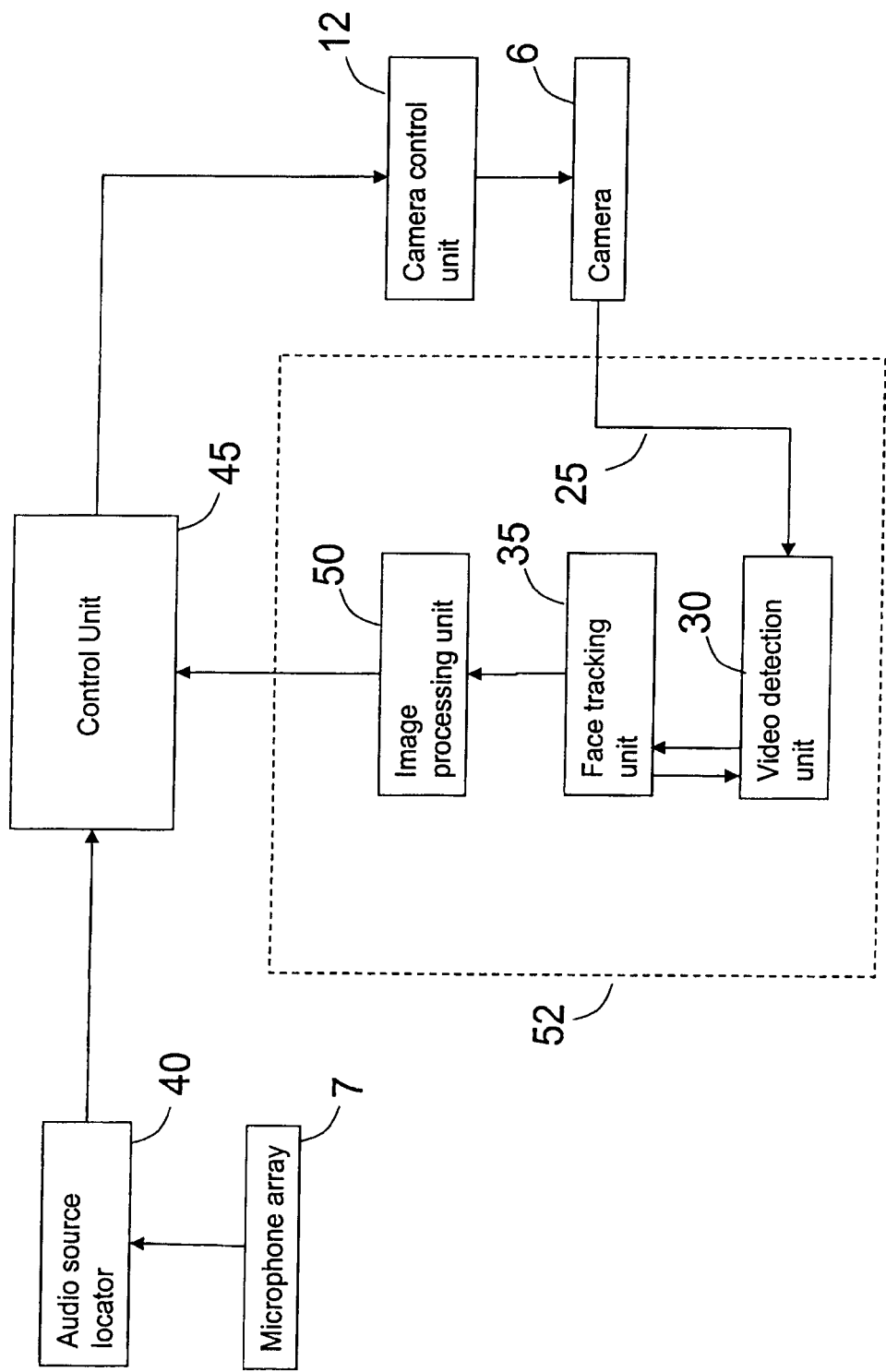
FIG. 2 schematically shows components of "best view" locator according to a non-limiting embodiment of the present invention.

FIG. 2 schematically shows the components in the "best view" locator 52 according to a non-limiting embodiment of the present invention. While FIG. 2 shows examples of hardware, it should be understood that the present invention can be implement in hardware, software, firmware, or a combination of these.

A video detection unit 30 is configured to continuously (or with very short intervals on an order of a second or millisecond) detect objects, e.g. faces and/or heads, in the frames of a captured video signal. At predefined events (e.g. when the VCS is switched on, when initiated through the user input device 8, etc.) the camera zooms out to its maximum field of view (or near maximum field of view) and moves to a predefined pan- and tilt-orientation (azimuth- and elevation-angle), capturing as much as possible of the room 10 where the system is situated. The video detection unit 30 analyses the frames in the video signal and detects all the faces/heads and their location in the video frame relative to a predetermined and static reference point (e.g. the center of the frame). The face/head location and size (or area) in the video image is transformed into camera coordinates (azimuth- and elevation angles and zoom factors). Information about each detected face/head (e.g. position, size, etc.) is sent to an image processing unit 50 via face tracking unit 35. Based on said face/head information the image processing unit defines a rectangular area that at least comprises all the detected faces/heads. A predefined set of rules dictates how the area should be defined, and the area represents the best view of the people in the frame (or video conferencing room 10). The camera coordinates (azimuth- and elevation angles and zoom factors) for the defined area and its location are sent to a control unit 45. The control unit instructs a camera control unit 12 to move the camera to said camera coordinates, and the camera's 6 pan, tilt and zoom is adjusted to frame an image corresponding to the defined area.

The image pickup device (or camera) 6 includes a camera control unit 12 for positioning the image pickup device. The camera control unit 12 is the steering mechanism. In one embodiment, the steering mechanism includes motors, controlling the pan- and tilt-orientation and the degree of zoom of the image pickup device 6. In another embodiment, the steering mechanism (or control unit 12) is configured to implement digital tilt, digital pan and digital zoom (i.e., digital pan/tilt/zoom). Digital zoom may be accomplished by cropping an image down to a centered area with the same aspect ratio as the original, and interpolating the result back up to the pixel dimensions of the original. It is accomplished electronically, without any adjustment of the camera's optics. Digital pan and tilt may be accomplished by using the cropped image and adjusting a viewing area within the larger original image. Also, other techniques of digital pan/tilt/zoom known to those of ordinary skill in the art may be used. It is possible that a combination of digital steering (digital pan/tilt/zoom) and mechanical steering may be used. An example of a camera with digital pan/tilt/zoom capability is the Tandberg 1000 camera.

The camera control unit 12 can also report back its current azimuth- and elevation angles and zoom factors on demand. The image processing unit 50 and the control unit 45 may supply control signals to the camera control unit 12. Camera control unit 12 uses a camera coordinate system which indicates a location based on azimuth- and elevation angles and zoom factors which describe the direction of the captured frame relative to camera 6 and the degree of zoom. Video detection unit 30 is configured to convert coordinate measurements expressed in a video (or image) coordinate system to coordinate measurements expressed in the camera coordinate system using the azimuth- and elevation angles and zoom factors of camera 6 when the frame was captured by camera 6.

Figure 3:
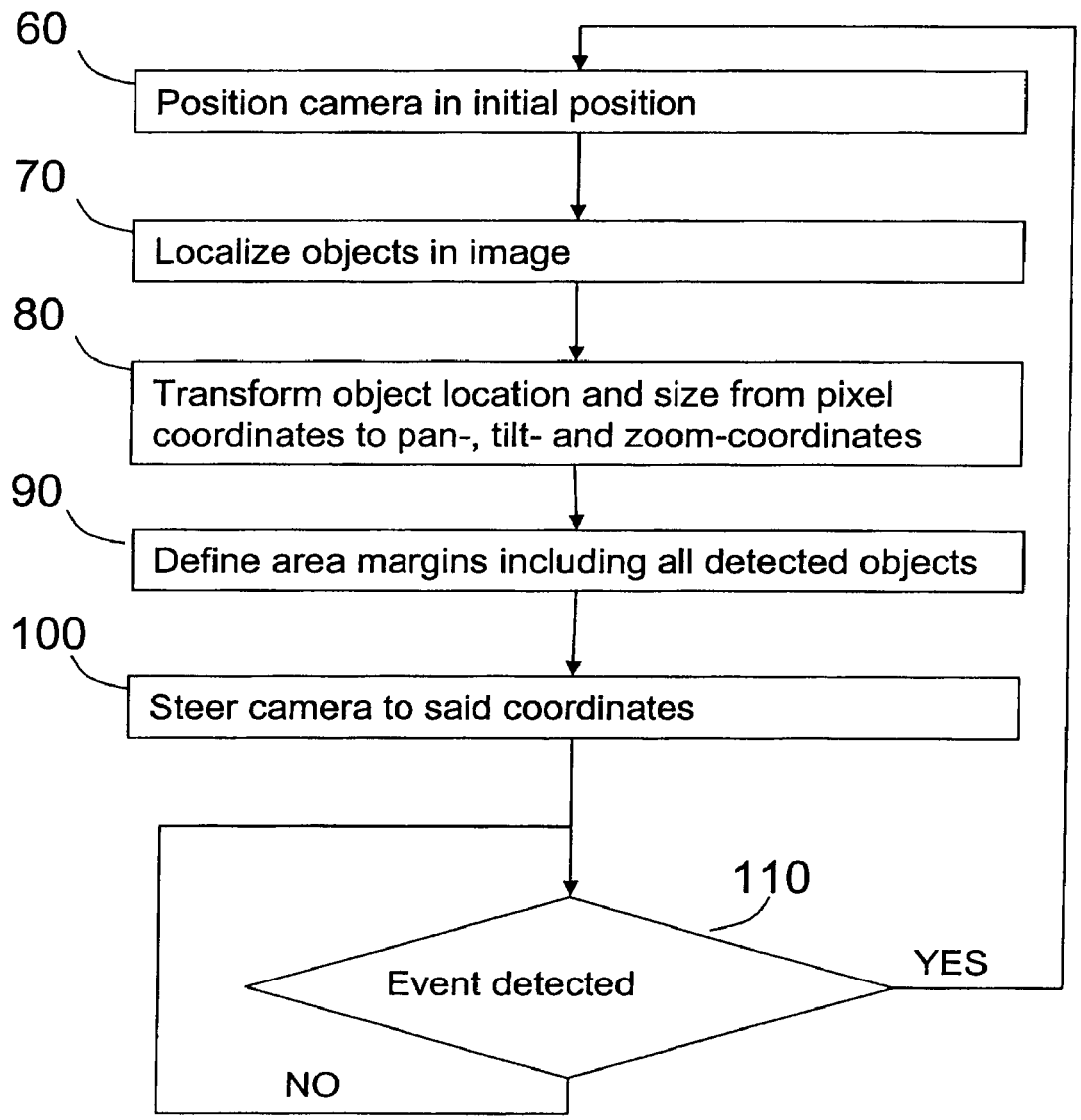
FIG. 3 is a flow chart of the operation of the "best view" locator, FIG. 4 schematically shows a typical video conferencing situation, and exemplary initial orientations of the image pickup device.

FIG. 3 is a flow chart of the operation of the "best view" locator 52. Camera 6 outputs a video signal comprising a series of frames (images). The frames are analyzed by the video detection unit 30. At predefined events, the camera control unit 12 is instructed to move the camera to an initial orientation (step 60). The object of the initial orientation is to make sure that the camera can "see" all the persons in the meeting room. There are several ways of deciding such an initial orientation.

Figure 4:
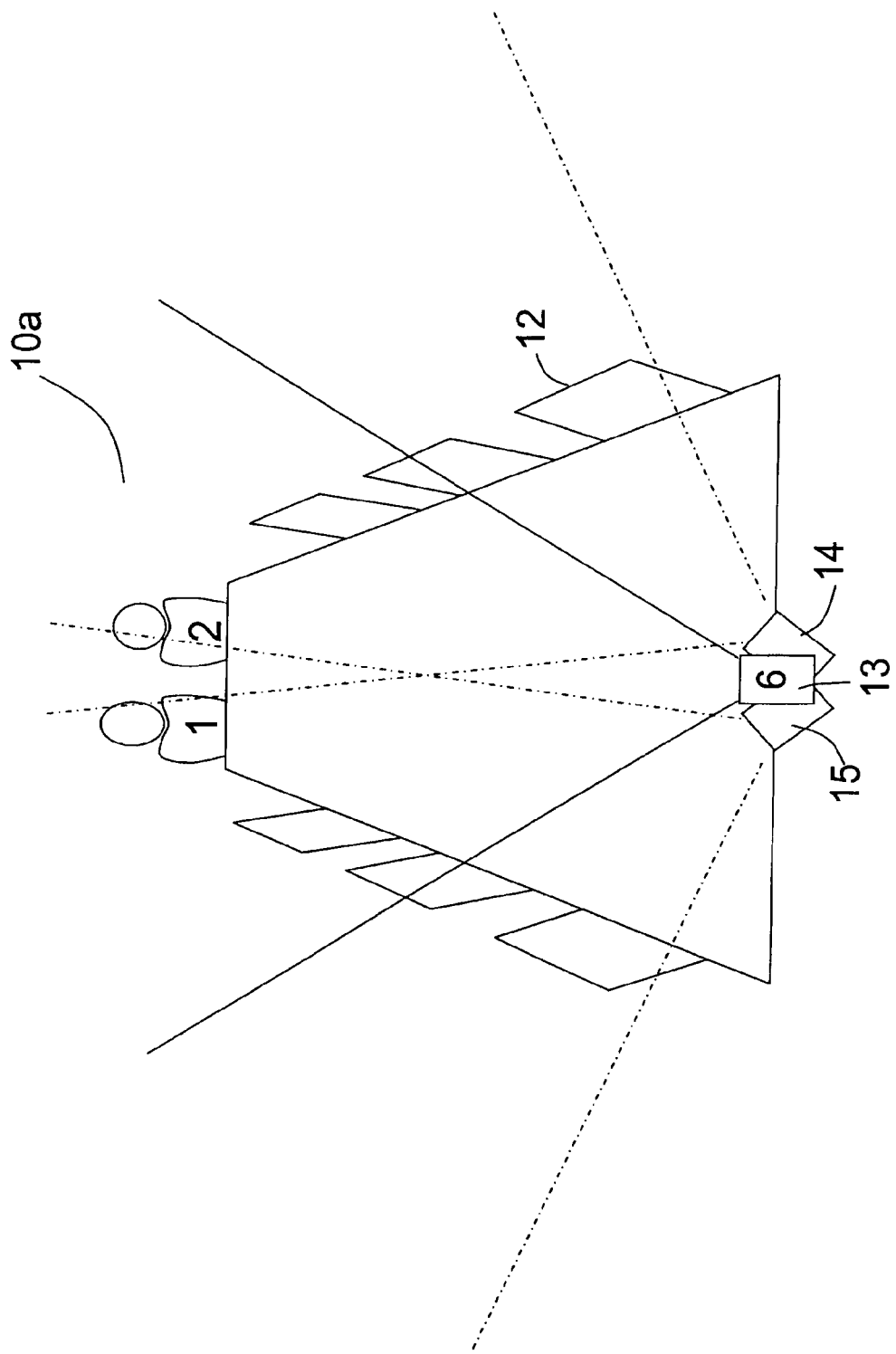

Referring to FIG. 4, according to one exemplary embodiment of the invention, the camera zooms out to its maximum field of view and moves to a predefined pan- and tilt-orientation 13, capturing as much as possible of the room 10a and/or capturing the part of the room with the highest probability of finding meeting participants. The predefined pan- and tilt-orientation (or initial orientation) is typically manually entered into the system through a set-up function (e.g. move camera manually to an optimal initial position and then save position) or it is a default factory value.

According to another exemplary embodiment of the invention, the camera is configured to capture the entire room by examining a set of initial orientations (14, 15) with a maximum field of view, and where the set's fields of view overlaps. In most cases, a set of 2 orientations will suffice. However, the number of orientations will depend on the cameras maximum field of view, and may be 3, 4, 5, 6, etc. For each orientation (14, 15) the one or more video frames are analyzed by video detection unit 30 to detect faces and/or heads and their respective locations. After analyzing all the orientations, the image processing unit 50 calculates the pan- and tilt orientation that includes all or a maximum amount possible of the detected participants, and defines said calculated orientation as the initial orientation.

A video detection unit 30 analyzes the video signals 25 from the camera 6 to detect and localize faces and/or heads (step 70) in a video frame. The video detection unit 30 measures the offset of the location of the detected faces/heads from some pre-determined and static reference point (for example, the center of the video image).

Figure 5:
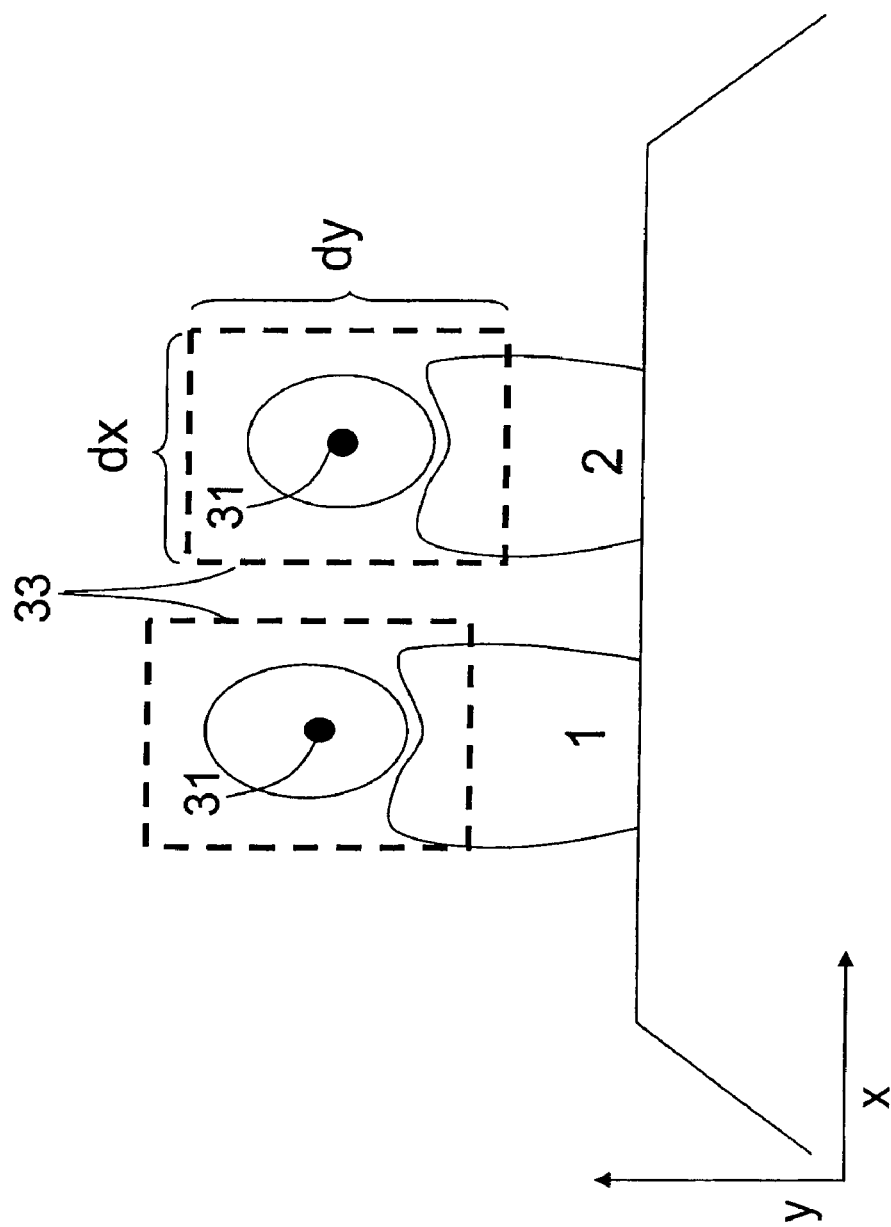
FIG. 5 illustrates face detection in an image containing two participants.

Different algorithms can be used for the object detection. Given an arbitrary video frame, the goal of face detection algorithms is to determine whether or not there are any faces in the image, and if present, return the image location and area (size) of each image of a face. Referring to FIG. 5, according to one exemplary embodiment of the present invention, an analysis window 33 is moved (or scanned) over the image. For each position of the analysis window 33, the image information within the analysis window 33 is analyzed at least with respect to the presence of typical facial features. However, it should be understood that the present invention is not limited to the use of this type of face detection. Further, head detection algorithms, known to those of ordinary skill in the art, may also be used to detect participants whose heads are not orientated towards the camera.

When an image of a face/head is detected, the video detection unit 30 defines a rectangular segment (or box) surrounding said image of a face/head. According to one embodiment of the invention, said rectangular segment is the analysis window 33. The location of said segment containing an image of a face/head is measured relative to a video coordinate system which is based on the video frame. The video coordinate system applies to each frame captured by camera 6. The video coordinate system has a horizontal or x-axis and a vertical or y-axis. When determining a position of a pixel or an image, video detection unit 30 determine that position relative the x-axis and the y-axis of that pixel's or image's video frame. In one exemplary embodiment of the invention, the analysis window 33 center point 31 (pixel in the middle of the window) is the location reference point, and its location is defined by the coordinates x and y in said video coordinate system. When the video detection unit 30 has calculated the location (x,y) and size (e.g. dx=20 dy=24 pixels) of all the faces/heads in a frame, the video detection unit 30 uses knowledge of the video frame, optics and mechanics to calculate (step 80) the corresponding location ($\alpha,\phi$) and size ($\Delta\alpha,\Delta\phi$) in azimuth and elevation angles in the camera coordinate system for each image of a face/head. The camera coordinates for each face/head are then sent to a face tracking unit 35.

Face tracking unit 35 correlates the detected faces from the current video frame to the detected faces in the previous video frames and hence tracks the detected faces through a series of frames. Only if a face/head is detected at substantially the same location throughout a series of frames, the detection is validated or registered as a positive detection. First of all this prevents false face detections, unless the same detection occurs in several consecutive video frames. Also, if the face detection unit fails to detect a face in the substantially same coordinates as a face has been detected before, the image tracking unit does not consider the face as absent from the image unless the detection has failed in several consecutive frames. This is to prevent false negative detections. Further, the tracking allows for obtaining a proper position of a participant who may be moving in a video frame. To perform this tracking, face tracking unit 35 creates and maintains a track file for each detected face. The track file can, for example, be stored in a memory device such as random access memory or a hard drive.

Figure 6:
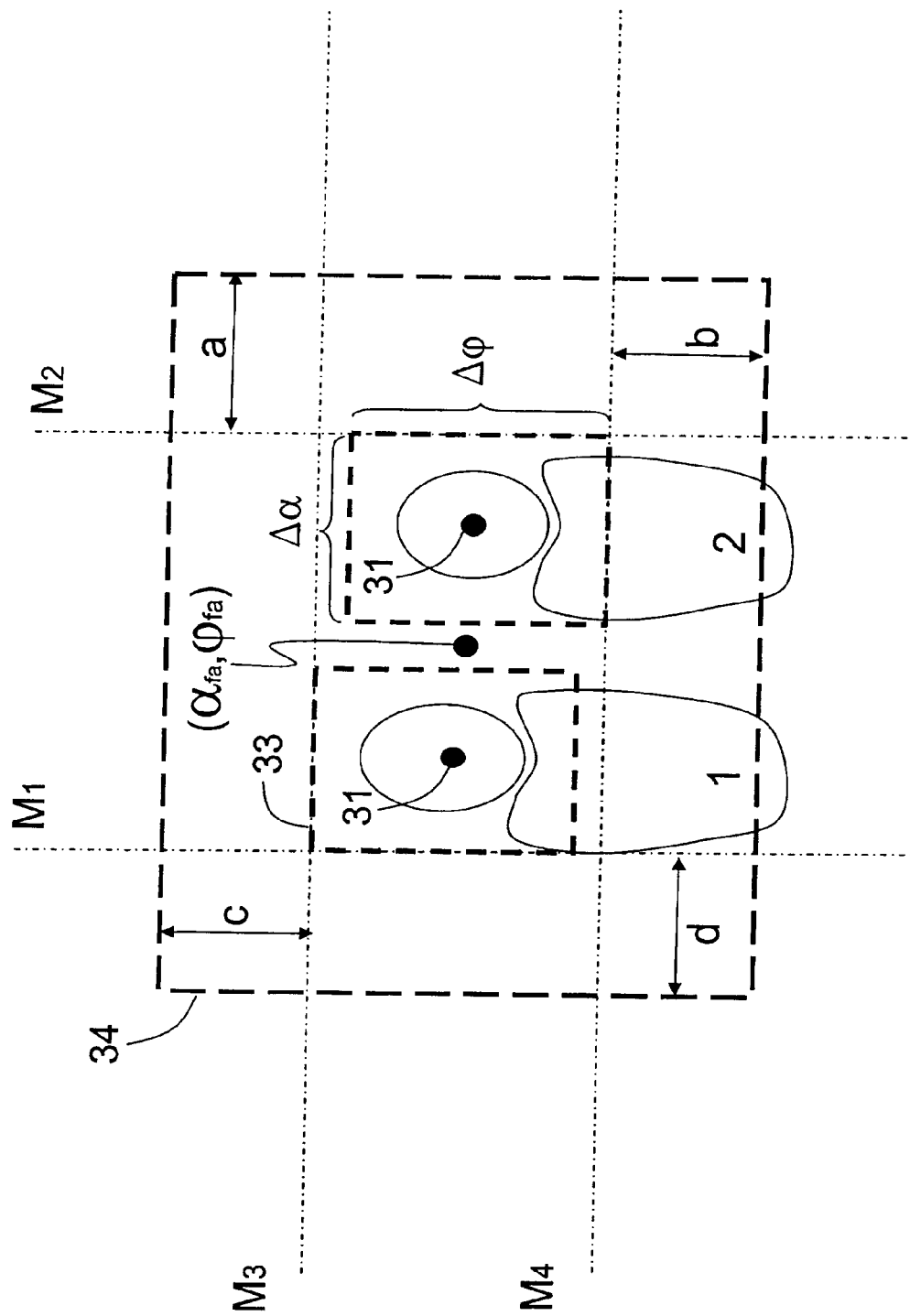
FIG. 6 illustrates one exemplary defined area of interest ("best view")

In step 90, the image processing unit 50 defines an area of interest 34 (best view). The area of interest 34 is shown in the in FIG. 6, where the area 34 at least comprises all the detected images of faces in that frame.

According to one embodiment of the invention, based on the location ($\alpha,\phi$) of each face and their corresponding sizes ($\Delta\alpha,\Delta\phi$), the image processing unit 50 may calculate a first area restricted by a set of margins ($M_1$, $M_2$, $M_3$ and $M_4$), where the margins are derived from the left side of the leftmost face segment ($M_1$), upper side of the uppermost face segment ($M_3$), right side of the rightmost face segment ($M_2$) and the bottom side of the bottommost face segment ($M_4$). The location of the center ($\alpha_{fa},\phi_{fa}$) of the first area can now be calculated in camera coordinates based on the margins. The location of the first area is relative to a reference point ($\alpha_0,\phi_0$), typically the direction of the camera when azimuth and elevation angle is zero. Further, the width and height of the first area is transformed into a zoom factor ($Z_{fa}$).

This first area is very close to the participants' faces and may not represent the most comfortable view (best view) of the participants, especially when only two participants are present as shown in this exemplary embodiment. Therefore, when said margins ($M_1$, $M_2$, $M_3$ and $M_4$) has been calculated, a second area (best view frame 34) is defined by expanding the margins by a set of offset values a,b,c and d. These offset values may be equal, or they may differ, e.g. to capture more of the table in front of the participants than above a participants head. The offset values may be preset and static, or they may be calculated to fit each situation.

According to another exemplary embodiment, the best view frame 34 is defined by just subtracting a compensation value $Z_c$ from the calculated zoom factor $Z_{fa}$, making the camera zoom out an additional distance. The compensation value $Z_c$ may be static, or vary linearly depending on the size of the first area zoom factor $Z_{fa}$.

Figure 7:
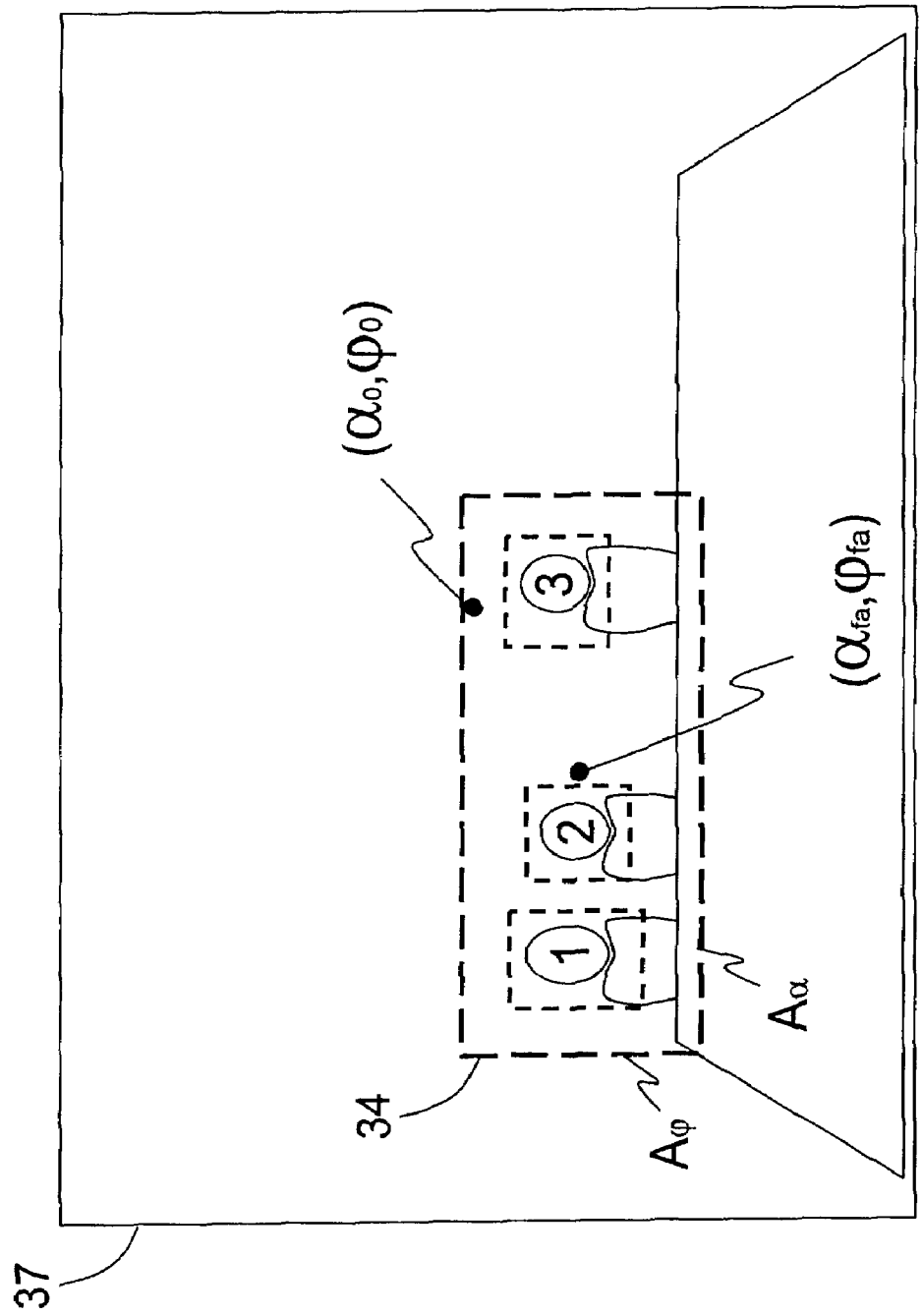
FIG. 7 illustrates another exemplary defined area of interest ("best view")

FIG. 7 schematically shows an exemplary video frame taken from an initial camera orientation. 3 faces have been detected in the video frame, and the image processing unit 50 has defined a best view frame 34, and calculated the location ($\alpha_{fa},\phi_{fa}$) of the best view frame.

Most image pickup devices 6 for video conferencing systems operate with standard television image aspect ratios, e.g. 4:3 (1.33:1) or 16:9 (1.78:1). Since most calculated best view frames 34 as described above have aspect ratios that deviate from the standards, e.g. 4:3 or 16:9, some considerations must be made when deciding the zoom coordinate. Since $\Delta\phi$ is the shortest edge of area 34, if the camera zooms in to capture the exact height $\Delta\phi$, large parts of the area will miss the light sensitive area (e.g. image sensor) in the camera because its aspect ratio is different than the defined area. If the camera zooms in to capture the exact width $A\alpha$ of the defined area 34, no information is lost.

Therefore, according to one exemplary embodiment of the present invention, the two sides $A_\phi$ and $A_\alpha$ of the best view frame 34 are compared. Each of the two sides defines a zoom factor needed to fit the area of interest in the image frame, in the horizontal and vertical direction respectively. Thus, the degree of zoom is defined by the smallest of the two calculated zoom factors, ensuring that the area of interest is not cropped when zooming to the area of interest.

Figure 8:
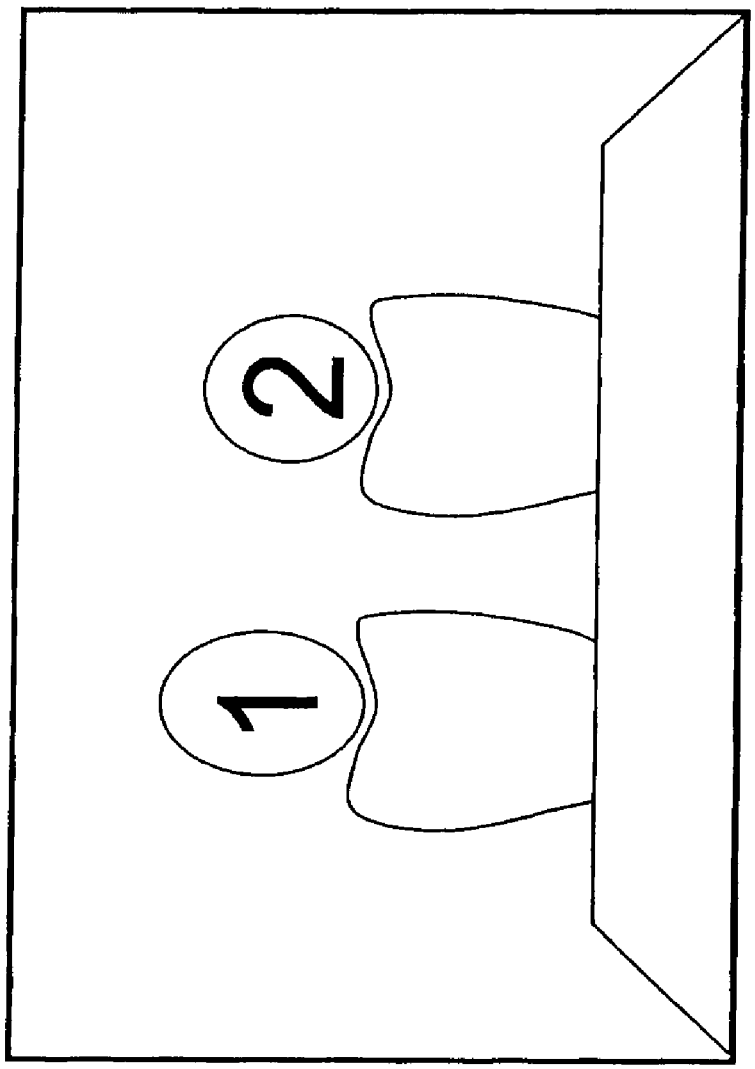
FIG. 8 illustrates a camera framing of the defined area in FIG. 6.

In step 100, the image processing unit 50 supplies the camera control unit 12 with the camera positioning directives ($\alpha_{fa}, \phi_{fa}, Z$) (azimuth, elevation, zoom) derived in step 90, via control unit 45. Once the camera positioning directives are received, the camera moves and zooms to the instructed coordinates, to get the best view of the participants in the video conference. FIG. 8 shows the best view of participant 1 and 2 from meeting room 10a in FIG. 6.

When the camera has moved to the new orientation, it will stay in that orientation until an event is detected (step 110). As mentioned earlier, the camera is only instructed to move the camera to an initial orientation (step 60) on certain predefined events. Such predefined events may include when the video conferencing system is started, when it is awakened from a sleep mode, when it receives or sends a conference call initiation request, when initiated by a user via e.g. remote control or keyboard, etc. Usually when an optimal view of the participants has been found, there is usually little need to change the orientation of the camera. However, situations may arise during a video conference that creates a need to reconfigure the orientation, e.g. one of the participants may leave, a new participant may arrive, one of the participants may change his/her seat, etc. Upon such situations, one of the users may of course initiate the repositioning (step 60) by pushing a button on the remote control. However, an automatic detection of such events is preferable.

Figure 10:
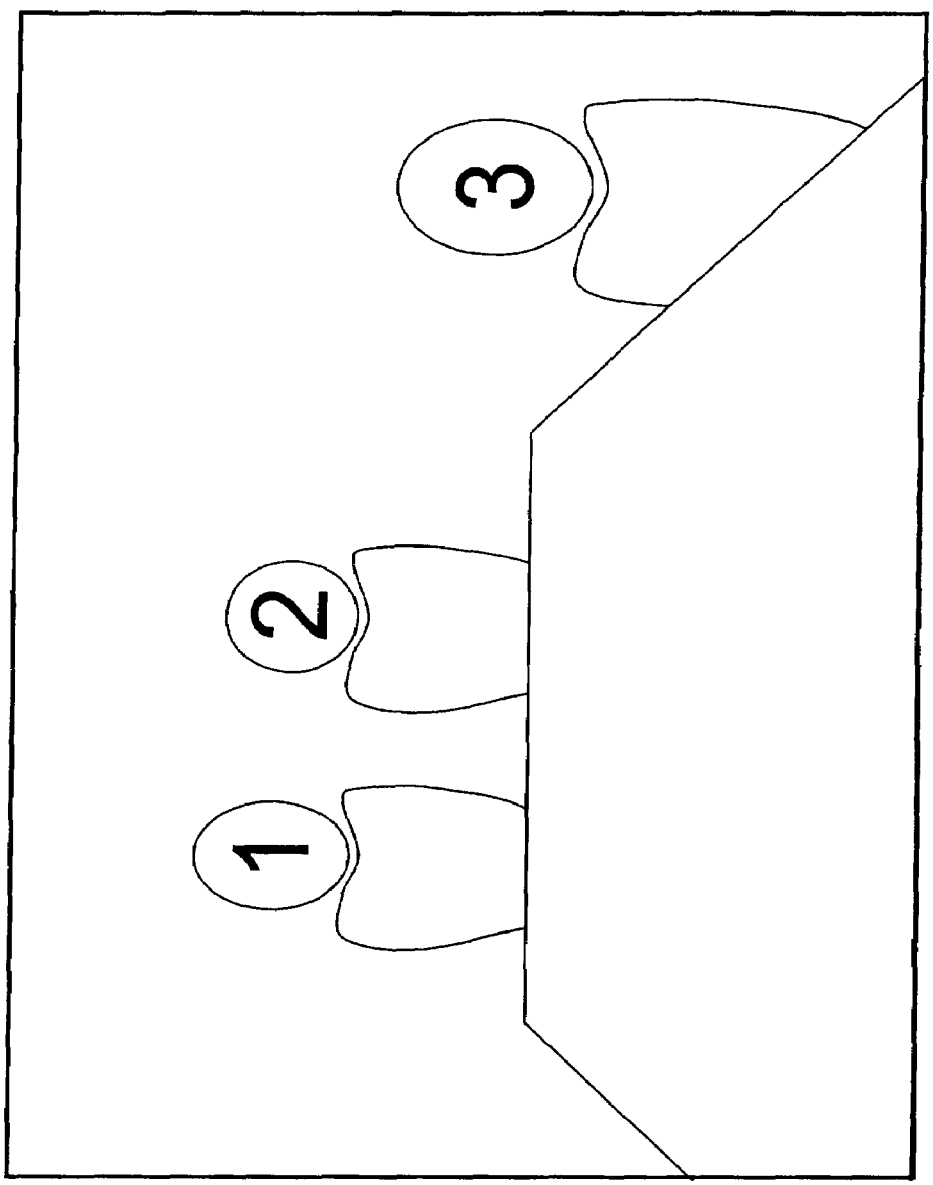
FIG. 10 illustrates a camera framing including a participant representing the audio source in FIG. 9, FIGS. 11a-d illustrate a participant leaving the cameras field of view, where.

Therefore, according to one embodiment of the present invention, audio source localization is used as an event trigger in step 110. As discussed above, FIG. 8 shows an optimal view of the 2 participants 1 and 2 in the large meeting room 10a. As can be seen in FIG. 8, in this view the camera has been zoomed in quite extensively, and if a person was to enter the conference late and sit down in one of the chairs 12, he/she would not be captured by the camera. When entering a meeting, it is natural to excuse yourself and/or introduce yourself. This is a matter of politeness, and to alert the other participants (that may be joining on audio only) that a new participant has entered the conference. By using known audio source localization arrangements 7,40, the video conferencing system can detect that an audio source (participant) 200 has been localized outside of the current field of view of the camera. The audio source locator 40 operates in camera coordinates. When an audio source has been detected and localized by the audio source locator 40, it sends the audio source coordinates to the control unit 45. Nothing is done if the audio source coordinates are within the current field of view of the camera. However, if the audio source coordinates are outside the current field of view, it indicates that the current field of view is not capturing all the participants, and the detection process according to steps 60-100 is repeated. The result can be seen in FIG. 10. Therefore, according to one embodiment of the invention, such detection of at least one audio source outside of the current field of view of the camera is considered as an event in step 110 triggering repetition of steps 60-100.

Audio source localization arrangements are known and will not be discussed here in detail. They generally are a plurality of spatially spaced microphones 7, and are often based on the determination of a delay difference between the signals at the outputs of the microphones. If the positions of the microphones and the delay difference between the propagation paths between the source and the different microphones are known, the position of the source can be calculated. One example of an audio source locator is shown in U.S. Pat. No. 5,778,082, which is incorporated by reference in its entirety.

According to another embodiment of the present invention another predefined event is when a participant is detected leaving the room (or field of view). Such detection depends on the tracking function mentioned earlier. As shown in FIG. 11a, when a participant leaves the room, the track file or track history will show that the position/location ($\alpha, \phi$) of a detected face changes from a position ($\alpha_3, \phi_3$) to a position ($\alpha_4, \phi_4$) close to the edge of the frame, over a sequence of frames (FIG. 11a-11b). If the same face detection suddenly disappears (no longer detecting a face) and do not return within a certain time frame (FIG. 11c), the face detection is considered as a participant leaving the conference. Upon detection of such an event, step 60-100 is repeated to adjust the field of view of the camera to a new optimal view as shown in FIG. 11d.

Figure 9:
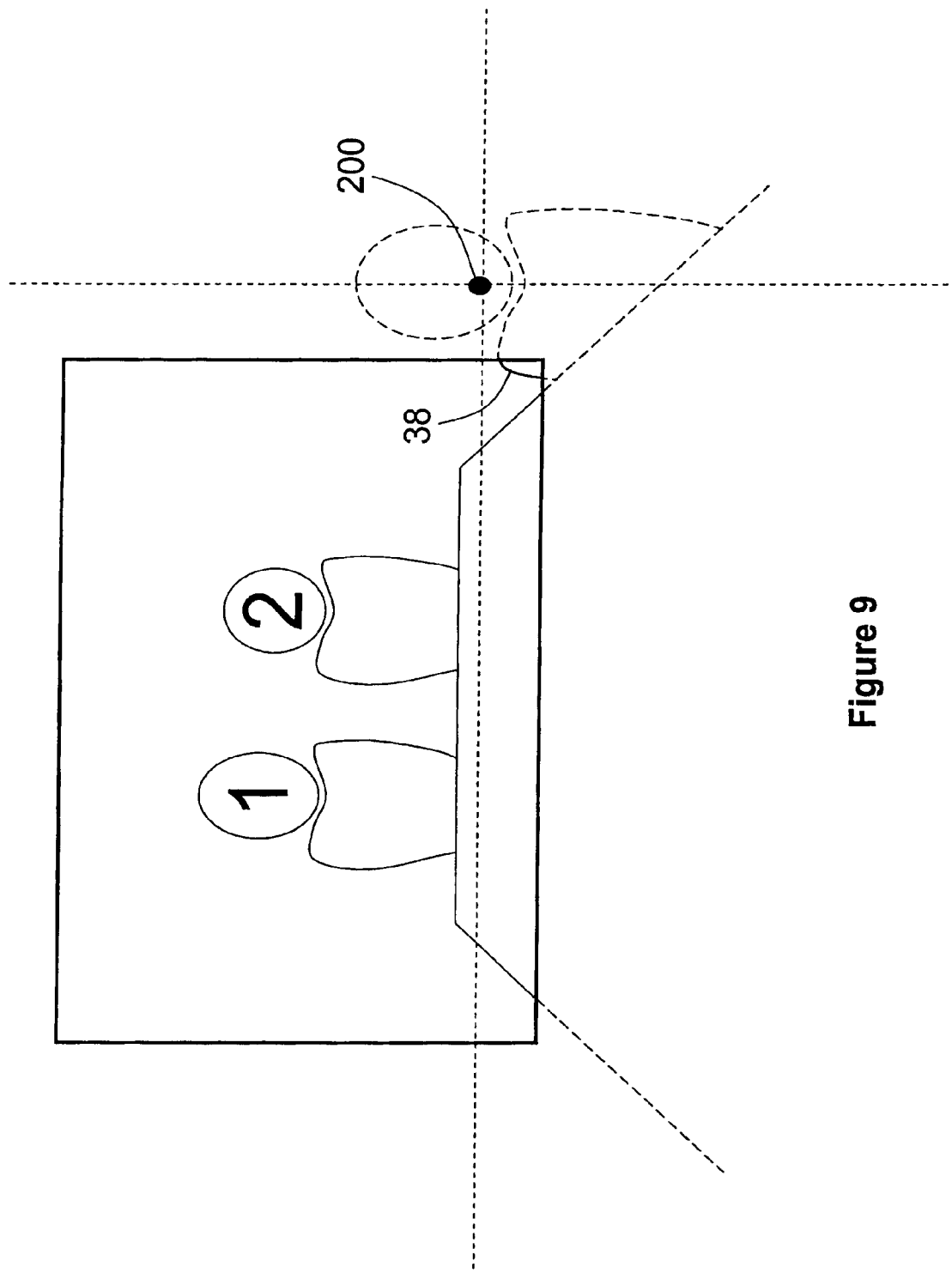
FIG. 9 illustrates an audio source detected outside the currently framed image.

According to yet another embodiment of the present invention, another predefined event is when movement is detected near the edge of the video frame. Not everybody entering a video conferencing room will start speaking at once. This will depend on the situation, seniority of the participant, etc. Therefore, it may take some time before the system detects the new arrival and acts accordingly. Referring back to FIG. 9, parts 38 of a participant may be captured in the video frame, even though most of the person is outside the camera's field of view. Since people rarely sit completely still, relative to the static furniture, the parts 38 can easily be detected as movement in the image by video detection unit 35. Upon detection of such an event (movement is detected near the image/frame edge), steps 60-100 are repeated to adjust the field of view of the camera to a new optimal view.

The systems according to the non-limiting embodiments discussed herein provide a novel way of automatically obtaining the best visual representation of all the participants in a video conferencing room. Further, the system is automatically adapting to new situations, such as participants leaving or entering the meeting room, and changing the visual representation accordingly. These exemplary embodiments of the present invention provide a more user friendly approach to a superior visual experience.

Figure 12:
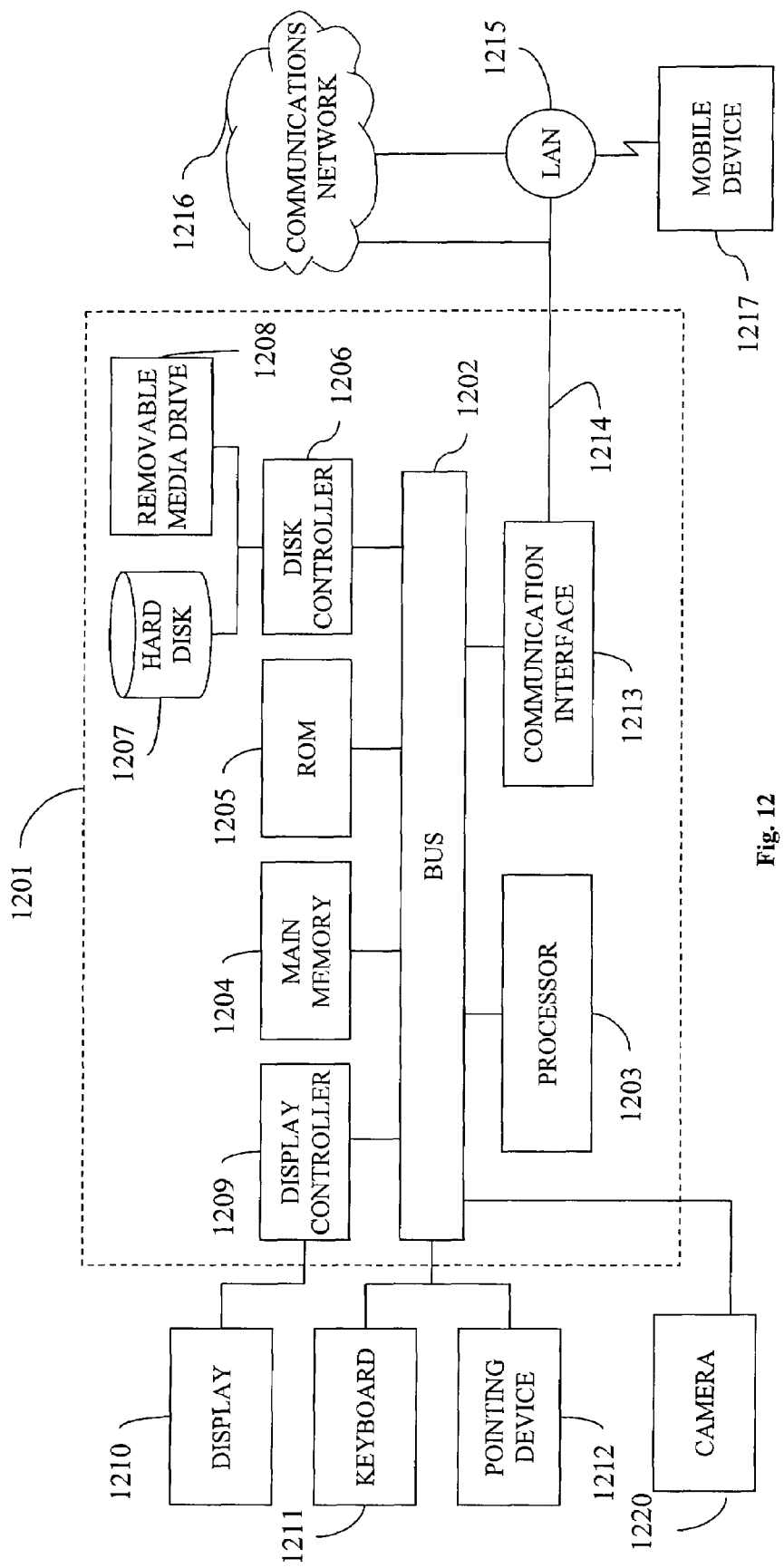
FIG. 12 is a block diagram of an exemplary computer system upon which an embodiment of the present invention may be implemented.

FIG. 12 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT) or LCD display, for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps in an embodiment of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes. Also, instructions may be stored in a carrier wave (or signal) and read therefrom.

Stored on any one or on a combination of computer readable storage media, the embodiments of the present invention include software for controlling the computer system 1201, for driving a device or devices for implementing the invention, and for enabling the computer system 1201 to interact with a human user. Such software may include, but is not limited to, device drivers, operating systems, development tools, and applications software.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable storage medium" as used herein refers to any physical medium that participates in providing instructions to the processor 1203 for execution. A computer readable storage medium may take many forms, including but not limited to, non-volatile media and volatile media. Non-volatile media includes, for example, optical, magnetic disks, and magneto-optical disks, such as the hard disk 1207 or the removable media drive 1208. Volatile media includes dynamic memory, such as the main memory 1204.

Various forms of computer readable storage media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Numerous modifications and variations of the present invention are possible in light of the above teachings. It is therefore to be understood that within the scope of the appended claims, the invention may be practiced otherwise than as specifically described herein.

The invention claimed is:

1. A method for automatically determining an orientation and zoom of an image pickup device associated with a video conferencing system, wherein said method comprises the steps of:
   generating, at said image pickup device, an image signal representative of an image framed by said image pickup device;
   processing the image signal to identify objects in said image;
   steering the image pickup device to an initial orientation;
   determining a location of all the identified objects relative to a reference point and determining respective sizes of the identified objects;
   defining an area of interest in said image, wherein said area of interest includes all the identified objects; and
   steering the image pickup device to frame said defined area of interest including all the identified objects where a center of the frame substantially coincides with a center formed by a group of all the identified objects.

2. The method according to claim 1, where said step of steering the image pickup device to frame said defined area of interest comprises:
   varying an azimuth angle and an elevation angle of the image pickup device; and
   varying a zoom of the image pickup device.

3. The method according to claim 1, where said step of steering the image pickup device to an initial orientation further comprise:
   zooming the image pickup device out to a maximum field of view;
   orienting the image pickup device according to a predefined pan- and tilt-orientation so as to frame as much as possible of a room in which the image pickup device is situated to capture.

4. The method according to claim 1, wherein the image signal represents a frame of a video, and the step of processing the image signal to identify objects further comprises:
   detecting images of faces or heads that appear in a series of frames of the video;
   tracking the detected faces or heads through the series of frames of the video;
   registering a detection of the face or head if said detection occurs in a predefined number of frames in the series of frames.

5. The method according to claim 4, wherein the step of defining the area of interest further comprises:
   defining a set of margins for a first area, where said first area is a smallest definable area enclosing all of said registered images of faces or heads; and
   defining said area of interest by expanding said margins by a set of offset values.

6. The method according to claim 5, wherein the area of interest is further defined to fit a predetermined image aspect ratio.

7. The method according to claim 1, wherein said area of interest represents a close-up view of the objects.

8. The method according to claim 1, wherein the method is implemented in response to receiving an indication of a predefined event, wherein the predefined event includes one of:
   switching on a video conferencing system, receiving or sending a conference call initiation request, and receiving a command from a user.

9. The method according to claim 1, where said method further comprises:
   processing an audio signal from a set of audio pickup devices to determine a location of an audio source relative to a reference point.

10. The method according to claim 1, wherein said method is implemented in response to detecting a presence of an audio source outside the framed area of interest.

11. The method according to claim 1, wherein said method is implemented in response to detecting a disappearance of one or more of the objects from the framed area of interest.

12. The method of claim 1, wherein the steering the image pickup device to the initial orientation includes using digital pan, tilt, or zoom, and the steering the image pickup device to frame said defined area of interest includes using digital pan, tilt, or zoom.

13. The method of claim 1, wherein the method further comprises:
   comparing a vertical length of the area of interest to a horizontal length of the area of interest, wherein each of the vertical length and the horizontal length relate to a zoom factor; and
   adjusting the image pickup device to have a degree of zoom corresponding with a smallest of the vertical length and the horizontal length.

14. A system for automatically determining an orientation and zoom of an image pickup device associated with a video conferencing system, wherein said system comprises:
   an image pickup device configured to generate image signals representative of an image framed by said image pickup device;
   a video detection unit configured to process the image signal to identify objects in said image, to determine a location of all the identified objects relative to a reference point, and to determine respective sizes of the identified objects;
   an image processing unit configured to define an area of interest in said image, wherein said area of interest includes all the identified objects; and
   a control unit configured to, on an occurrence of a predefined event,
   steer the image pickup device to an initial orientation, to receive camera coordinates from said image processing unit corresponding to said area of interest, to steer the image pickup device to frame said area of interest including all the identified objects where a center of the frame substantially coincides with a center formed by a group of all the identified objects.

15. The system according to claim 14, wherein the image signal represents a frame of a video, and where the identified objects are detected images of faces or heads that appear in a series of frames of the video.

16. The system according to claim 15, further comprising:
a face tracking unit configured to track the detected faces or heads through the series of frames, and to register a detection as a face or head if said detection occurs in a predefined number of frames in the series of frames.

17. The system according to claim 15, wherein said image processing unit is further configured to
define a set of margins for a first area, where said first area is a smallest definable area enclosing all of said registered images of faces or heads, and to define said area of interest by expanding said margins by a set of offset values.

18. The system according to claim 17, where the area of interest is defined to fit a predetermined image aspect ratio.

19. The system according to claim 14, further comprising:
an audio source locator configured to process an audio signal from a set of audio pickup devices, to determine a location of an audio source in camera coordinates.

20. The system according to claim 14, wherein said control unit is further configured to receive audio source coordinates from said audio source locator, and to compare said audio source coordinates to a current field of view.

21. The system according to claim 14, wherein said image pickup device comprises a camera control unit for positioning said image pickup device, wherein the control unit is configured to supply control signals to said camera control unit for the orientation and zoom of the image pickup device, the control signal being generated based on said area of interest.

22. The system according to claim 14, wherein the predefined event comprises detecting a presence of an audio source outside a current field of view.

23. The system according to claim 14, wherein the predefined event comprises detecting a disappearance of one or more of the objects from the framed area of interest.

24. The system according to claim 14, where the said predefined event comprises detecting a presence of an audio source outside the framed area of interest.

25. The system of claim 14, wherein the image processing unit is further configured to compare a vertical length of the area of interest to a horizontal length of the area of interest, wherein each of the vertical length and the horizontal length relate to a zoom factor, and to adjust the image pickup device to have a degree of zoom corresponding with a smallest of the vertical length and the horizontal length.

26. A computer readable storage medium encoded with instruction, which when executed by a computer, causes the computer to implement a method for automatically determining an orientation and zoom of an image pickup device associated with a video conferencing system, wherein said method comprises the steps of:
generating, at said image pickup device, an image signal representative of an image framed by said image pickup device;
processing the image signal to identify objects plural users of the video conferencing system in said image;
steering the image pickup device to an initial orientation;
determining a location of all the identified objects relative to a reference point and determining respective sizes of the identified objects;
defining an area of interest in said image, wherein said area of interest includes all the identified objects; and
steering the image pickup device to frame said defined area of interest including all the identified objects where a center of the frame substantially coincides with a center formed by a group of all the identified objects.

27. A system for automatically determining an orientation and zoom of an image pickup device associated with a video conferencing system, comprising:
means for generating, at said image pickup device, an image signal representative of an image framed by said image pickup device;
means for processing the image signal to identify objects plural users of the video conferencing system in said image;
means for steering the image pickup device to an initial orientation;
means for determining a location of all the identified objects relative to a reference point and determining respective sizes of the identified objects;
means for defining an area of interest in said image, wherein said area of interest includes all the identified objects; and
means for steering the image pickup device to frame said defined area of interest including all the identified objects where a center of the frame substantially coincides with a center formed by a group of all the identified objects.

* * * * *